United States Patent [19]

Maynard et al.

[11] 4,180,621

[45] Dec. 25, 1979

[54] PRESSURE-SENSITIVE DUPLICATING STENCIL

[75] Inventors: Michael Maynard, London; Walter Jones, Harlow, both of England

[73] Assignee: Gestetner Limited, London, England

[21] Appl. No.: 421,263

[22] Filed: Dec. 3, 1973

[30] Foreign Application Priority Data

Dec. 4, 1972 [GB] United Kingdom ............... 55968/72

[51] Int. Cl.² ......................... B32B 29/00; B41N 1/24; B05C 17/06

[52] U.S. Cl. .................................... 428/535; 428/537; 428/211; 101/127; 101/128.21; 427/143

[58] Field of Search .................. 117/6, 68, 68.5, 76 P, 117/35.5, 35.6; 101/127, 128.2, 128.3; 161/267, 268, 1; 427/143, 209, 282, 284, 143-146; 428/537, 535; 282/27.5

[56] References Cited

U.S. PATENT DOCUMENTS

| | | | |
|---|---|---|---|
| 525,675 | 9/1894 | Brodrick | 101/128.2 |
| 1,600,226 | 9/1926 | Hartmann | 117/35.5 |
| 1,771,563 | 7/1930 | Gestetner | 101/128.1 |
| 1,828,766 | 10/1931 | de Waele | 117/35.5 |
| 2,012,526 | 8/1935 | Whitmore | 101/128.2 |
| 2,018,501 | 10/1935 | Orr | 101/128.2 |
| 2,203,280 | 6/1940 | Heath | 101/128.2 |
| 2,206,899 | 7/1940 | Kellgren | 161/406 |
| 2,351,696 | 6/1944 | Nichols et al. | 117/35.5 |
| 2,732,795 | 1/1956 | Brandt et al. | 117/35.6 |
| 3,113,671 | 12/1963 | Mooney | 101/128.2 |
| 3,194,153 | 7/1965 | Rogerson | 101/127 |
| 3,595,166 | 7/1971 | Sherman | 101/128.2 |
| 4,123,581 | 10/1978 | Davis et al. | 101/128.2 |

FOREIGN PATENT DOCUMENTS

| | | | |
|---|---|---|---|
| 267316 | 1/1927 | Canada . | |
| 422217 | 8/1944 | Canada . | |
| 1379384 | 1/1964 | France . | |
| 6510598 | 2/1966 | Netherlands . | |
| 255361 | 7/1926 | United Kingdom . | |
| 1222419 | 2/1971 | United Kingdom | 101/128.2 |

*Primary Examiner*—Marion E. McCamish

*Assistant Examiner*—Alexander S. Thomas

*Attorney, Agent, or Firm*—Cushman, Darby & Cushman

[57] ABSTRACT

Pressure-sensitive duplicating stencils comprise an impregnated sheet of stencil tissue strippably attached by a laminating coating to a backing sheet, which is removed during use of the imaged stencil.

9 Claims, No Drawings

PRESSURE-SENSITIVE DUPLICATING STENCIL

This invention relates to pressure-sensitive duplicating stencils made to be imaged by typewriting, printing or handwriting. The term "stencil" is used herein to refer to unimaged stencil blanks. Stencils ready for use carrying images are termed "imaged stencils".

Commercially available duplicating stencils designed to be imaged by typing consist of a thin sheet of porous stencil tissue carrying a stencilizable ink-impervious plastics coating. The tissue is fixed along one edge to a relatively strong paper backing sheet which is folded where it is attached to the tissue to form the head of the stencil. This head is perforated so that the stencil sheet can be fixed to the duplicating machine. It is the usual practice to insert, between the stencil sheet and the backing sheet, a sheet of carbon paper with its waxed side next to the stencil sheet. This carbon paper acts as a cushioning material during typing and also improves the legibility of the typed text in the imaged stencil. In addition, a thin sheet of plastics film is sometimes superimposed on the stencil sheet to improve the quality of the stencilled image. Such stencils therefore consist, in the form in which they are inserted into the typewriter for typing, of three or four sheets. Such known stencil sheets, attached only to the head of the backing sheet, can crease or fold in the pack or when offered to the typewriter, an operation necessarily performed with one hand. The sheets of carbon paper can suffer in the same way and must be separately packed and inserted between stencil and backing sheet before entry into the typewriter. Alternatively the sheets of carbon paper can be fixed under the stencil head, but in this case they must be formulated to avoid marking the stencil during its whole shelf life. Any corrections, if they are to be inconspicuous on the final copy, must be made after separating stencil sheet and carbon paper before application of correcting fluid.

The FIGURE shows a pressure-sensitive duplicating stencil prepared in accordance with this invention.

The present invention replaces this three or four sheet assembly by a single unit. The new stencil requires no carbon cushion during typing, and legibility in the typewriter is achieved by other means. Corrections can be made without any prior separation of layers, and the stencil is better protected against creasing in the pack or in the typewriter. It is also more convenient for the typist and saves time in the office. According to the present invention, a pressure-sensitive duplicating stencil comprises (1) a sheet of stencil tissue impregnated with a stencilizable ink-impervious plastics coating (the "main coating") and carrying on one side, preferably the tissue side (as hereinafter defined), a further stencilizable and adhesive plastics coating (the "laminating coating"), and (2) a backing sheet strippably attached to said laminating coating. As in the known stencils, one edge of the backing sheet may, if desired, be folded to form a head for the stencil which may carry perforations so that the stencil can easily be fixed to a duplicating machine. Preferably, the new stencil also carries a dulling coating on the opposite side of the stencil tissue to the laminating coating, i.e. preferably on the coated side (as hereinafter defined) of the sheet of stencil tissue.

When the main coating is applied to one side of the highly porous stencil tissue, a substantial proportion of the coating penetrates to the opposite side. This main coating is therefore essentially an impregnating coating, but there is nevertheless an appreciable difference between the side of first contact during the coating operation and the reverse side. The former is called herein the "coated side" and the latter the "tissue side".

The stencil tissue used in the duplicating stencils of the present invention may be of the same kind as that used in known duplicating stencils. Thus, it may be, for example, a manilla tissue weighing 11 grams per square meter and having a void content of 20 to 25%.

The main coating may have a composition similar to that of the coating used in known duplicating stencils. Thus it may comprise a film-forming material, e.g. cellulose acetate, cellulose acetate/butyrate, ethyl cellulose, an alkyd resin, a cyclized ketone resin, a natural resin such as shellac, or preferably nitro-cellulose, and a substantial proportion of non-solvent plasticising oil. Suitable nitrocellulose has a nitrogen content of 11.8 to 12.2%, and may be of medium or low viscosity grade. Suitable non-solvent plasticizing oils are higher fatty acids and higher fatty alcohols, e.g. those containing a single ethylenic double bond in each molecule, lower alkyl esters of saturated long chain fatty acids, and vegetable oils, e.g. oleic acid, oleyl alcohol, butyl stearate, coconut oil or castor oil. Mineral oil or sperm oil maybe added as an extender and small proportions of solvent plasticizers, e.g. esters of unsaturated fatty acids e.g. oleic, ricinoleic or acetylricinoleic acid, low molecular weight glyceryl esters, e.g. diacetin or triacetin, and polyglycols such as diethylene glycol and triethylene glycol, may also be included in the coating compositions to modify their properties, e.g. resilience, coherence, or, in the case of the laminating coating, adhesiveness. The overall ratio of plasticising oils to nitro-cellulose or other film-forming material (hereinafter called the "oil ratio") varies from coat to coat but, for the main coating should be in the range 8:1 to 11:1 and preferably 9:1 to 10.5:1. The weight of the main coating may be from 20 to 80 grams per square meter of tissue, but is preferably from 30 to 50 grams per square meter.

The laminating coating is generally coated directly on to the main coating, but, if desired, one or more intermediate coatings may be interposed, such intermediate coatings generally having compositions similar to that of the main or laminating coating. The latter may contain a film-forming material different from that in the main coating but preferably has a composition similar to that of the main coating except that the oil ratio is 7:1 to 11:1, preferably 9:1 to 10.5:1 and the coating weight may be from 5 to 30 grams per square meter, preferably 10 to 18 grams per square meter.

Both the main and laminating coatings are applied as a solution of the major constituents (film former and plasticising oils) in an appropriate solvent, any remaining ingredients being in solution or suspension, and the solvent is then removed by evaporation. It is important that each coating is dry before any further coat is applied to it, and care is necessary to ensure adequate adhesion of each coating without excessive interpenetration of adjacent layers.

In the case of the laminating coating, the backing sheet is brought into contact with the coating before the latter has dried, as known per se in the process of laminating two sheets with wet adhesive. The amount of residual solvent for optimum results depends on its composition and on the properties of the backing. Simple experiments suffice to determine the amount within practical limits.

The backing sheet may be a stout Kraft or wood-free cartridge paper which has been highly calendered or smoothly coated with polyethylene or polyethylene-modified wax on the side to be strippably attached to the laminating coating. A preferred paper is highly calendered release paper weighing 90 to 150 grams per square meter and 0.002 to 0.008 inch (0.05 to 0.2 mm.) thick. It may be white or coloured, but any colours must, of course, be fast and non-bleeding in the solvents and oils employed in the coating formulations.

As already stated, the duplicating stencil preferably comprises a dulling coating on the opposite side of the stencil tissue to the laminating coating. This coating may have a composition similar to that of the main and laminating coatings, but has an oil ratio of only 1:1 to 6:1, preferably 2:1 to 4:1, and is applied in a coating weight of only 2 to 5 grams per square meter. When nitro-cellulose is used as the film-forming material, it may contain a lower proportion of nitrogen than that used in the main coating, e.g. 10.5 to 11.2%. The coating must, of course contain appropriate dulling ingredients, such as a minor proportion, e.g. 10 to 40% by weight based on the solids content, of very finely divided silica, e.g. silica aerogel, fume silica, or diatomaceous earth.

It is desirable to arrange that, when the stencil coating is pushed aside during imaging of the stencil, the image so produced shows up on the duplicating stencil. This may conveniently be done by ensuring that there is a contrasting colour between the main or the laminating coating and the backing sheet, or between the main and laminating coatings themselves. Thus, for example, the backing sheet may be coloured (e.g. black, green or blue), the main coating may be essentially colourless, and the laminating coating white. When such a stencil is imaged, the colour of the backing sheet will show through the imaged areas of the stencil coating. In an alternative arrangement, the main coating may be coloured blue or green and the laminating coating and the backing sheet white. When such a stencil is imaged, the image will appear white against the background colour of the main coating.

The laminating coating may, if desired, contain an antistatic agent, e.g. a polyoxyethylenated alcohol or phenol or a surface-active quaternary ammonium compound, to assist in ensuring orderly deliveries of duplicated copies from the duplicating machine.

All the coatings applied to the stencil tissue preferably contain one or more anti-oxidants, e.g. an alkylated phenol, to stabilize the oils present.

The duplicating stencils of the present invention are imaged in exactly the same way as known duplicating stencils by typewriting, printing or handwriting. Following imaging, the strippable backing sheet is removed and the imaged stencil then used in exactly the same way as the imaged duplicating stencils which are currently available.

The following Examples illustrate the invention.

EXAMPLE 1

| Main coating | Parts by wt. |
|---|---|
| Nitrocellulose (11.8-12.2% nitrogen, medium viscosity, FHM 15/20 of I. C. I. Ltd.) | 10 (dry wt.) |
| Coconut oil | 4.2 |
| Diethylene glycol | 2.8 |
| Butyl stearate | 16.2 |

-continued

| Main coating | Parts by wt. |
|---|---|
| Oleic acid | 81.7 |
| Microlith blue 4GA (CIBA-Clayton) | 3.8 |
| Nonoxol DCP (an alkylated-bisphenol anti-oxidant of I.C.I. Ltd.) | 2.0 |
| Ethyl acetate | 46 |
| Methylated spirit (0.3% water by weight) | 139 |

The oil ratio in this coating is 10.5:1. Stencil tissue is coated with this composition and then dried to a dry weight of 40 grams per square meter (g./m$^2$).

| Dulling coating | Parts by wt. |
|---|---|
| Nitrocellulose (11.8-12.2% nitrogen low viscosity FHL 120/170 of I.C.I. Ltd.) | 10 (dry wt.) |
| Castor oil | 30 |
| Celite 209 (diatomaceous earth of Johns Manville Corp.) | 4.5 |
| Santocel C (silica aerogel of Monsanto Industrial Chemical Co.) | 5.5 |
| Nonoxol DCP | 1 |
| Ethyl acetate | 46 |
| Methylated spirit (0.3% water by weight) | 344 |

The oil ratio in this composition is 3.0:1. This composition is applied to the sheet already coated (on the coated side) and dried, so that the total dry weight of the two coatings is 43 g./m$^2$.

| Laminating coating | Parts by wt. |
|---|---|
| Nitrocellulose (FHM 15/20 of I.C.I. Ltd.) | 10 (dry wt.) |
| Castor oil | 19.2 |
| Oleyl alcohol | 38.4 |
| Oleic acid | 33.6 |
| Mineral oil (viscosity ca 0.6 poise) | 4.8 |
| Diethylene glycol | 4.1 |
| Titanium dioxide | 15 |
| Nonoxol DCP | 3.4 |
| Ethyl acetate | 58 |
| Methylated spirit (0.3% water by weight) | 175 |

The oil ratio is 10:1. This coating composition is applied to the tissue side of the sheet of stencil tissue in an amount corresponding to a dry weight of 10 to 18 g./m$^2$ and, while still wet, is brought into contact with the polyethylene coated (0.001" or 0.0025 mm. thick) surface of an MG litho paper weighing 70 g./m$^2$. The product is dried without blistering and adheres in a strippable manner.

This stencil yielded satisfactory copies when subjected to standard typing tests and the text could be corrected or altered with acceptable results.

EXAMPLE 2

Example 1 was repeated using, as the backing sheet, a release-type highly calendered paper. The product gave equally satisfactory copies and better corrections than the final product of Example 1.

EXAMPLE 3

| Main coating | Parts by wt. |
|---|---|
| Nitrocellulose (FHM 15/20 of I.C.I. Ltd.) | 10 (dry wt.) |
| Coconut oil | 4 |
| Diethylene glycol | 2.7 |
| Butyl stearate | 15.4 |
| Oleic acid | 77.6 |

-continued

| Main coating | Parts by wt. |
|---|---|
| Titanium dioxide | 0.5 |
| Nonoxol DCP | 2 |
| Ethyl acetate | 46 |
| Methylated spirit (0.3% water by weight) | 139 |

The oil ratio should be in the range 9.2:1 to 10.7:1. This composition is coated on stencil tissue to a total dry coating weight of about 40 g./m².

Dulling coat

The same composition as in Example 1 was applied to the coated side of the stencil sheet and raised the dry coating weight to 43 g./m².

| Laminating coating | Parts by wt. |
|---|---|
| Nitrocellulose (FHM 15/20 of I.C.I. Ltd.) | 10 (dry wt.) |
| Castor oil | 18.6 |
| Oleyl alcohol | 37.2 |
| Oleic acid | 32.6 |
| Mineral oil | 4.6 |
| Diethylene glycol | 4 |
| Titanium dioxide | 15 |
| Nonoxol DCP | 3.4 |
| Ethyl acetate | 58 |
| Methylated spirit (0.3% water by weight) | 175 |

The oil ratio is in the range 9.2:1 to 10.2:1. This composition was applied to the tissue side of the stencil tissue carrying the main and the dulling coating in an amount corresponding to 10 to 18 g./m² dry weight and while wet was brought into contact with a calendered blue Kraft casing paper. Satisfactory copies were obtained but the legibility on the stencil surface was inferior to that in the products of Examples 1 and 2.

The accompanying drawing shows, in diagrammatic cross-section, a pressure-sensitive duplicating stencil in accordance with the present invention. A sheet of stencil tissue 9 is impregnated with a stencilizable ink-impervious plastics coating 10. The coated side of the said plastics coating carries a dulling coating 11. The tissue side of the plastics coating carries a stencilisable and adhesive laminating plastics coating 12 which serves to laminate, in strippable manner, a backing sheet 13 to the said laminating plastics coating 12 along the line 14. In use, an image is formed in the duplicating stencil by pressure applied, for example, with a typewriter key 15. The pressure exerted by the imaging device displaces the plastics coating 10 together with the dulling coating 11 and the laminating coating 12 from the imaged areas of the stencil thereby exposing the ink-pervious stencil tissue 9. After imaging, the backing sheet 13 is stripped from the remainder of the duplicating stencil while the later is in place on the duplicating machine. Copies are then produced in the duplicating machine in the same way as with prior known duplicating stencils.

We claim:

1. In a pressure-sensitive duplicating stencil comprising (1) a sheet of stencil tissue impregnated with a typable stencilisable ink-impervious main plastics coating comprising film-forming material and non-solvent plasticising oil and (2) a backing sheet, the improvement comprising providing, between the impregnated stencil tissue and backing sheet, (3) a typably stencilisable, substantially continuous laminating plastics coating comprising film-forming material and non-solvent plasticising oil the said coating serving to temporarily adhere the impregnated stencil tissue to the backing sheet over substantially the whole of their contacting surfaces, thereby providing a stencil unit in the form of a single sheet.

2. A stencil according to claim 1 wherein the laminating plastics coating (3) is provided as a coating on the impregnated stencil tissue (1).

3. A stencil according to claim 1 in which the said laminating plastics coating is on that side of the main plastics coating opposite to the side to which the main plastics coating was applied.

4. A stencil according to claim 1 in which the overall ratio of plasticizing oil to film-forming material in the main coating is 9:1 to 10.5:1 and the weight of the main coating is 30 to 50 grams per square meter.

5. A stencil according to claim 1 in which the overall ratio of plasticizing oil to film-forming material in the laminating coating is 9:1 to 10.5:1 and the weight of the laminating coating is 10 to 18 grams per square meter.

6. A stencil according to claim 1 which also carries a dulling coating comprising film-forming material and non-solvent plasticising oil on the opposite side of the stencil tissue to the laminating plastics coating.

7. A stencil according to claim 6 in which the overall ratio of plasticizing oil to film-forming material in the dulling coating is 2:1 to 4:1 and the weight of the dulling coating is 2 to 5 grams per square meter.

8. A stencil according to claim 1 in which the film-forming material in the main and laminating coatings is nitrocellulose having a nitrogen content of 11.8 to 12.2% and of medium or low viscosity grade.

9. A stencil according to claim 1 in which there is a contrasting colour between the main or the laminating coating and the backing sheet or between the main and laminating coatings themselves, such as to render easily visible an image in said stencil.

* * * * *